Nov. 4, 1924.

P. R. SLEDGE, JR 1,514,020

INSECT EXTERMINATOR

Filed April 14, 1923      2 Sheets-Sheet 1

Paul R. Sledge Jr.
INVENTOR

BY Victor J. Evans
ATTORNEY

Nov. 4, 1924.                       P. R. SLEDGE, JR                       1,514,020
                                    INSECT EXTERMINATOR
                                Filed April 14, 1923         2 Sheets-Sheet 2
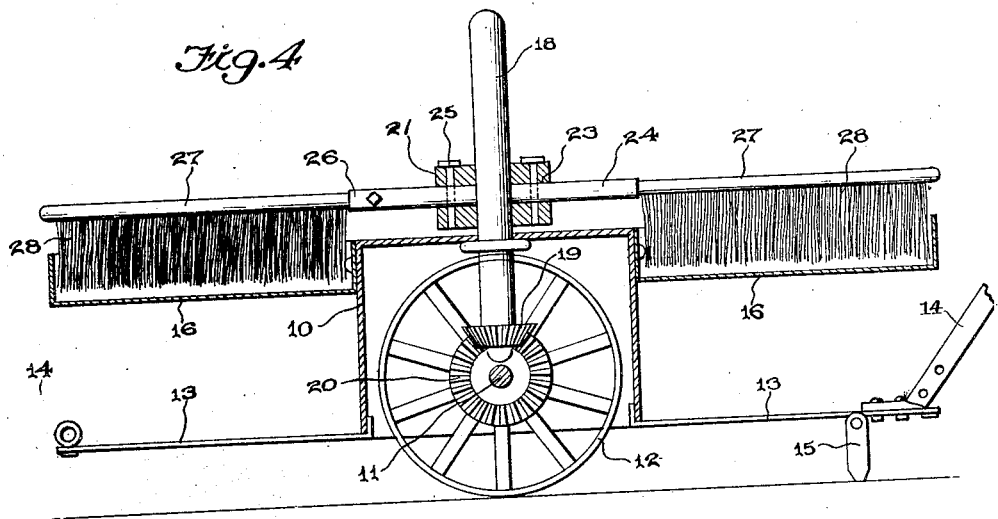
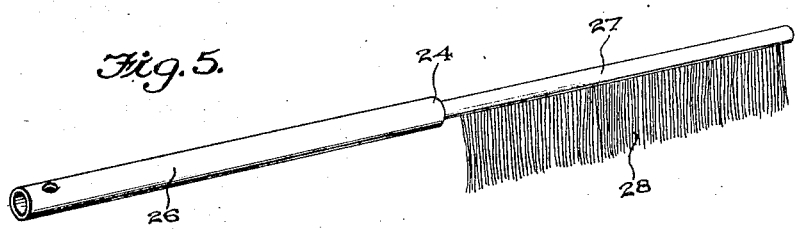
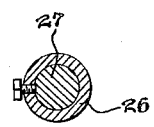
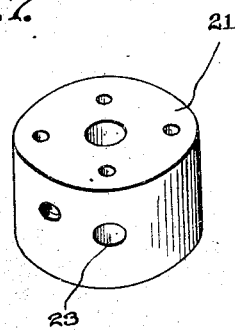
Paul R. Sledge Jr.
INVENTOR
BY Victor J. Evans
ATTORNEY
WITNESS:

Patented Nov. 4, 1924.

1,514,020

UNITED STATES PATENT OFFICE.

PAUL ROSSIGNOT SLEDGE, JR., OF AUGUSTA, GEORGIA.

INSECT EXTERMINATOR.

Application filed April 14, 1923. Serial No. 632,111.

*To all whom it may concern:*

Be it known that I, PAUL R. SLEDGE, Jr., a citizen of the United States, residing at Augusta, in the county of Richmond and State of Georgia, have invented new and useful Improvements in Insect Exterminators, of which the following is a specification.

This invention relates to improvements in insect exterminators and has for an object the provision of a machine whereby a suitable insecticide may be economically and evenly distributed over plants, flowers and the like without injury thereto.

Another object of the invention is the provision of a machine for this purpose, whereby the amount of insecticide distributed and the area covered during the distributing operation may be easily regulated.

With the above and other objects in view, the invention further includes the following novel features and details of construction, to be hereinafter more fully described, illustrated in the accompanying drawings and pointed out in the appended claims.

In the drawings:—

Figure 4 is a central longitudinal sectional view.

Figure 5 is a detail perspective view of one of the wiper elements or sweeps.

Figure 6 is a transverse sectional view of the same.

Figure 7 is a detail perspective view of the adjustable block for holding the wiper elements or sweeps.

Figure 1:
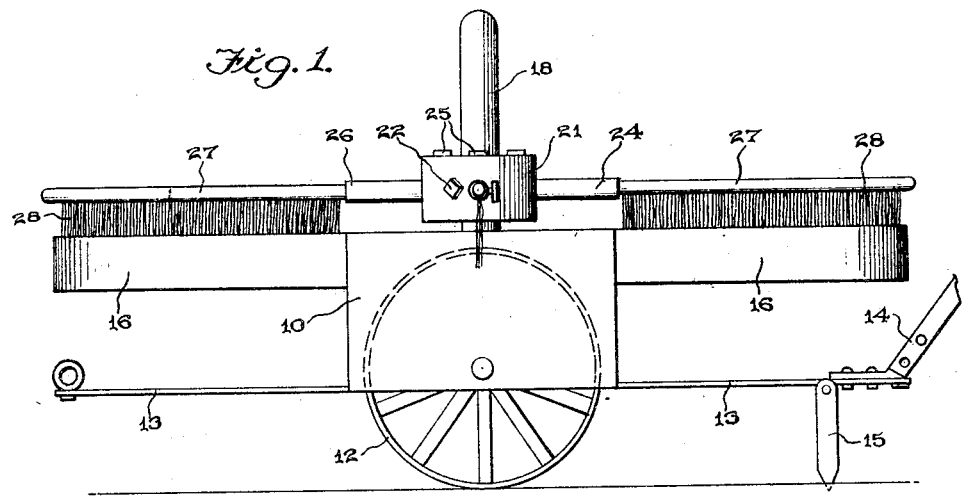
Figure 1 is a side elevation of the invention.
Figure 2:
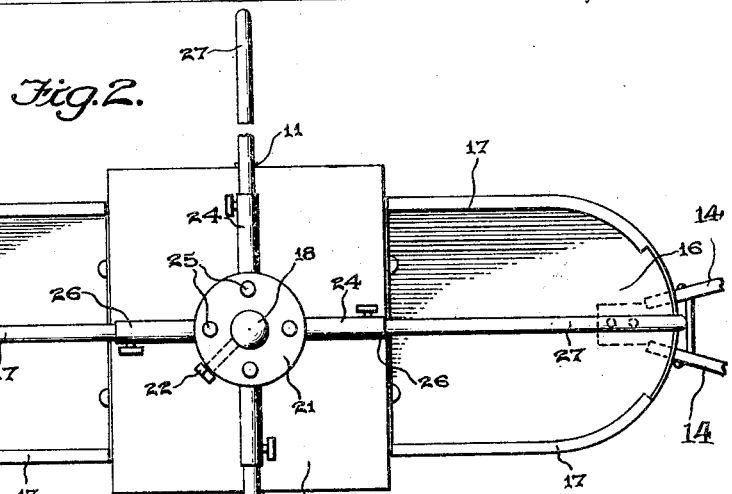
Figure 2 is a top plan view of the same.
Figure 3:
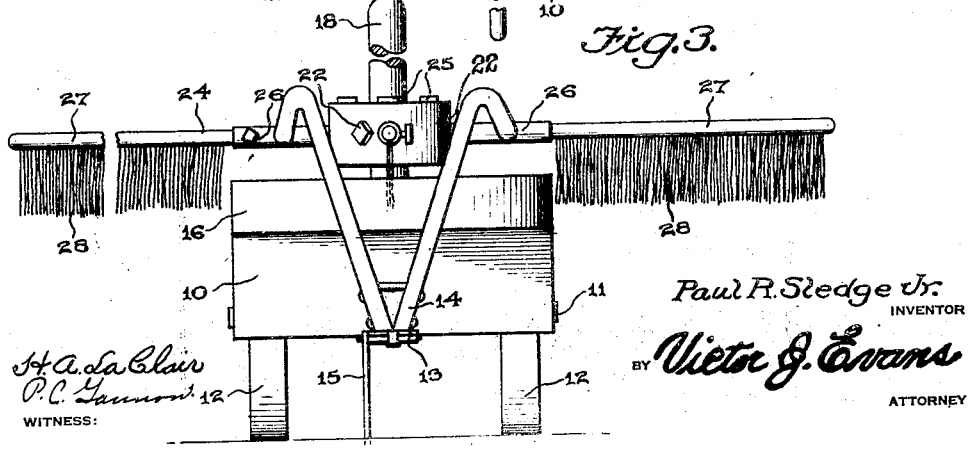
Figure 3 is an end view.

Referring in detail to the drawings wherein like characters of reference denote corresponding parts, the reference character 10 indicates the body of the machine which may be of any suitable structure and which provides a bearing for an axle 11 upon which is mounted wheels 12 which support the body. The axle is located centrally of the frame and extending from each end of the latter is a tongue 13, which may have attached thereto suitable handles, such as plow handles 14. This provides convenient means at each end of the machine whereby the same may be either pushed or pulled. Any other means may be attached to these tongues and the machine drawn or propelled by an animal or a tractor. Pivotally secured to one of the tongues 13 is a leg 15 for supporting the machine in a horizontal position.

Secured to each end of the machine is a pan 16 which is designed to hold a suitable insecticide. This insecticide may be of any character and is preferably of a sticky character so as to adhere to the foliage of the plant and prevent the escape of insects coming in contact therewith. This pan may be of any suitable shape and is preferably provided along each side edge with an inturned flange 17, the purpose of which will be hereinafter apparent.

Extending downwardly through the frame 10 is a vertically disposed shaft 18 which has secured to its lower end a beveled gear 19, the latter engaging the beveled gear 20 secured upon the axle 11 so that as the machine is propelled, the shaft 18 will be rotated.

Mounted upon the shaft 18 above the machine frame 10 is a block or collar 21, the latter being capable of vertical adjustment upon the shaft 18 and held in adjusted position by means of set screws 22. This collar is provided with radially disposed openings 23 which receive the inner ends of arms 24. The arms are held in place by means of bolts 25 which extend downwardly through the block 21 and through openings provided in the arms 24.

The arms 24 are adjustable as to their length and for this purpose include an inner section 26 and an outer section 27, the latter telescoping within the former. The section 27 carries a wiper 28 in the form of a plurality of strands of rope or cotton fabric.

In the use of the invention, the machine is passed along the rows of plants to be treated, rotation of the wheels 12 operating to impart a horizontal rotary movement to the sweeps and the latter passing through the pans 16 in a manner to take up a portion of their contents and wipe the same over the plants. The amount of the insecticide delivered by the sweeps may be regulated by the vertical adjustment of the block 21, which adjustment will also serve to regulate the degree of contact of the sweeps with the plants, so that the said sweeps may touch the plants lightly and avoid injury thereto.

The invention is susceptible of various changes in its form, proportions and minor details of construction and the right is herein reserved to make such changes as properly fall within the scope of the appended claims.

Having described the invention what is claimed is:—

1. A machine of the class described comprising a body, supporting wheels therefor, a vertical shaft extending through the body, means operatively connecting the shaft and supporting wheels for rotating the former, wiper elements extending radially from the shaft, an open top receptacle located in the path of the wiper elements and means whereby said elements may be adjusted to regulate their length.

2. A machine of the class described comprising a body, supporting wheels therefor, a vertical shaft extending through the body, means operatively connecting the shaft and supporting wheels for rotating the former, wiper elements extending radially from the shaft, said elements each comprising a horizontally disposed telescopically adjustable arm and a flexible absorbent material hanging from said arm, an open top receptacle located in the path of the wiper elements and means whereby the wiper elements may be vertically adjusted.

3. A machine of the class described comprising a body, supporting wheels therefor, a vertical shaft extending through the body, means operatively connecting the shaft and supporting wheels for rotating the former, wiper elements extending radially from the shaft, an open top receptacle located in the path of the wiper elements and inwardly extending flanges carried by the receptacle for contact by the wiper elements.

In testimony whereof I affix my signature.

PAUL ROSSIGNOT SLEDGE, Jr.